(12) United States Patent
Lou et al.

(10) Patent No.: US 6,914,934 B1
(45) Date of Patent: Jul. 5, 2005

(54) MULTIPLIER-FREE METHODS AND APPARATUS FOR SIGNAL PROCESSING IN A DIGITAL COMMUNICATION SYSTEM

(75) Inventors: Hui-Ling Lou, Murray Hill, NJ (US); Markus Rupp, Utrecht (NL)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/390,389

(22) Filed: Sep. 3, 1999

(51) Int. Cl.[7] .................................................. H03H 7/30
(52) U.S. Cl. ..................................................... 375/229
(58) Field of Search ................................ 375/259, 261, 375/341, 229, 231–232

(56) References Cited

U.S. PATENT DOCUMENTS

| | | | |
|---|---|---|---|
| 4,381,546 A | | 4/1983 | Armstrong |
| 4,520,490 A | * | 5/1985 | Wei ............................. 375/246 |
| 5,289,501 A | * | 2/1994 | Seshadri et al. ............ 375/286 |
| 6,233,271 B1 | * | 5/2001 | Jones et al. .................. 375/142 |
| 6,611,567 B1 | * | 8/2003 | Balakrishnan et al. ...... 375/298 |

OTHER PUBLICATIONS

Randy H. Katz, Contemporary Logic Design, The Benjamin/Cummings Publishing Company, Inc, pp. 266–269.*
Durant et al, "Implementation of a Broadband Equalizer for High–Speed Wireless Data Communications", IEEE, 1015–1020.*

S. Ariyavisitakul et al, "Reduced–complexity equalization techniques for broadband wireless channels," IEEE Journals of Selected Areas in Communications, vol. 15, pp 5–15, Jan. 1997.*

G.M. Durant et al., "Implementation of a Broadband Equalizer for High–Speed Wireless Data Applications," Proc. IEEE ICUPC 98, Florence, Italy, pp. 1015–1020, Oct. 1998.

(Continued)

*Primary Examiner*—Kevin Burd (57) ABSTRACT

Signal processing operations are performed in a digital communication system receiver on a sequence of received symbols, each representing a number of information bits. The symbols correspond to points in a given modulation constellation generated by applying a predetermined rotation, e.g., a 45° rotation, to an otherwise conventional modulation constellation, e.g., a QPSK constellation, a 16-QAM constellation, etc. The use of the rotated constellation allows certain signal processing operations, such as filtering, Least-Mean-Squares (LMS) estimation, and Maximum-Likelihood (ML) sequence detection via the Viterbi algorithm, to be performed without the need for multipliers. By eliminating or substantially reducing the number of required multiplication operations, the invention significantly reduces the complexity and delay associated with the corresponding signal processing circuitry. Advantageously, this reduction in complexity and delay is accomplished without the use of any approximation or other reduction in precision.

19 Claims, 8 Drawing Sheets

OTHER PUBLICATIONS

T.A.C.M. Claasen et al., "Comparison of the Convergence of Two Algorithms for Adaptive FIR Digital Filters," IEEE Trans. on Acoustics, Speech and Signal Processing, vol. ASSP–29, No. 3, pp. 670–678, Jun. 1981.

D.L. Duttweiler, "A Twelve–Channel Digital Echo Canceler," IEEE Trans. on Communications, vol. COM–26, No. 5, pp. 647–653, May 1978.

R.D. Gitlin et al., "On the Design of Gradient Algorithms for Digitally Implemented Adaptive Filters," IEEE Trans. on Circuit Theory, vol. CT–20, No. 2, pp. 125–136, Mar. 1973.

M.D. Meyer et al., "A Modular Pipelined Implementation of a Delayed LMS Transversal Adaptive Filter," Proc. of ISCAS, New Orleans, pp. 1943–1946, 1990.

P. Kabal, "The Stability of Adaptive Minimum Mean Square Error Equalizers Using Delayed Adjustment," IEEE Trans. on Communications, vol. COM–31, No. 3, pp. 430–432, Mar. 1983.

G. Long et al., "The LMS Algorithm with Delayed Coefficient Adaptation," IEEE Trans. on Acoustics, Speech and Signal Processing, vol. 37, No. 9, pp. 1397–1405, Sep. 1989.

G. Long et al., "Corrections to 'The LMS Algorithm with Delayed Coefficient Adaptation'," IEEE Trans. on Signal Processing, vol. 40, No. 1, pp. 230–232, Jan. 1992.

M. Rupp et al., "Analysis of LMS and NLMS Algorithms with Delayed Coefficient Updated Under the Presence of Spherically Invariant Processes," IEEE Trans. on Signal Processing, vol. 42, No. 3, pp. 668–672, Mar. 1994.

E. Bjarnason, "Active Noise Cancellation Using a Modified Form of the Filtered–X LMS Algorithm," Proc. Eusipco Signal Processing VI, Brüssel, pp. 1053–1056, 1992.

T. Kimijima et al., "A Pipelined Architecture for DLMS Algorithm Considering Both Hardware Complexity and Output Latency," Proc. Eusipco, Patras, Greece, pp. 503–506, Sep. 1998.

* cited by examiner

| $b_1$ | $b_0$ | $u$ |
|---|---|---|
| 0 | 0 | 1 |
| 0 | 1 | j |
| 1 | 0 | −1 |
| 1 | 1 | −j |

| MODULATION | SECTION 1.1 NO. OF ADD/SUB OPERATIONS | CONVENTIONAL NO. OF ADD & MULTIPLY |
|---|---|---|
| QPSK | $2M - 2$ | $(4M-2)$ & $4M$ |
| 16-QAM | $3M - 2$ | $(4M-2)$ & $4M$ |
| 64-QAM | $4M - 2$ | $(4M-2)$ & $4M$ |
| 256-QAM | $5M - 2$ | $(4M-2)$ & $4M$ |
| 1024-QAM | $6M - 2$ | $(4M-2)$ & $4M$ |

| S(A) | S(B) | op | Z | S(Z) |
|---|---|---|---|---|
| + | + | A + B | A + B | + |
| + | − | A − B | A − B | + |
| − | + | B − A | B − A | + |
| − | − | −A −B | A + B | − |

| MODULATION | COMPLEXITY | MINIMUM LATENCY |
|---|---|---|
| QPSK | $4M$ | $2 + \log_2 M$ |
| 16-QAM | $8M$ | $4 + \log_2 M$ |
| 64-QAM | $12M$ | $6 + \log_2 M$ |

| MODULATION | CONVENTIONAL | SECTION 1.1 | MINIMAL OPERATIONS (SECTION 1.2) |
|---|---|---|---|
| QPSK | 2 x 4 = 8 | 0 | 0 |
| 16-QAM | 4 x 16 = 64 | 32 | 14 |
| 64-QAM | 4 x 64 = 256 | 160 | 68 |

MULTIPLIER-FREE METHODS AND APPARATUS FOR SIGNAL PROCESSING IN A DIGITAL COMMUNICATION SYSTEM

FIELD OF THE INVENTION

The invention relates generally to digital communication systems and, more particularly, to signal processing operations, such as filtering, channel estimation, and channel equalization, for use in such systems.

BACKGROUND OF THE INVENTION

Channel estimation and equalization are important determinants of the quality of achieved data throughput in a digital communication system receiver. In conventional receivers, channel estimation is often performed using a technique known as Least-Mean-Squares (LMS) estimation, while channel equalization is performed using Maximum-Likelihood (ML) sequence detection via the Viterbi algorithm. A problem with these existing techniques is that, in their original form, they generally require many complex multiplication operations. More particularly, LMS estimation requires 2M multiplications, and a full-search Viterbi algorithm requires PM multiplications, where M is the order of the channel estimator, and P is the size of the symbol alphabet. The large number of multiplications may render these conventional estimation and equalization techniques prohibitively expensive in terms of the required computational resources, particularly at very high data rates.

Subsequent implementations of the LMS estimation technique have attempted to reduce the required number of multiplications through the use of signed approximations of a regression vector and/or an error signal, as described in, e.g., T. A. C. M. Claasen and W. F. G. Mecklenbräuker, "Comparison of the convergence of two algorithms for adaptive FIR digital filters," IEEE Trans. on Acoustics, Speech and Signal Processing, Vol. ASSP-29, No. 3, pp. 670–678, June 1981; D. L. Duttweiler, "A twelve-channel digital echo canceler," IEEE Trans. on Communications, Vol. COM-26, No. 5, May 1978; and R. D. Gitlin, J. E. Mazo and M. G. Taylor, "On the design of gradient algorithms for digitally implemented adaptive filters," IEEE Trans. on Circuit Theory, Vol. 20, No. 2, pp. 125–136, March 1973. These non-linear methods, however, can alter the training behavior such that the training speed is considerably reduced. As a result, these methods are typically suitable for use only in applications in which long training sequences are available, e.g., broadcasting applications.

It has also been proposed that pipelining be introduced in order to increase the throughput of the implemented hardware, as described in, e.g., M. D. Meyer and D. P. Agrawal, "A modular pipelined implementation of a delayed LMS transversal adaptive filter," Proc. of ISCAS, New Orleans, pp. 1943–1946, 1990. A pipelining technique, however, leads to delayed updates that also corrupt the learning behavior of the LMS algorithm. See, e.g., P. Kabal, "The stability of adaptive minimum mean square error equalizers using delayed adjustment," IEEE Trans. on Communications, Vol. COM-31, No. 3, pp. 430–432, March 1983; G. Long, F. Ling and J. A. Proakis, "The LMS algorithm with delayed coefficient adaptation," IEEE Trans. on Acoustics, Speech and Signal Processing, Vol. ASSP-37, No. 9, pp. 1397–1405, September 1989; and G. Long, F. Ling and J. A. Proakis, "Corrections to 'The LMS algorithm with delayed coefficient adaptation'," IEEE Trans. on Signal Processing, Vol. SP-40, No. 1, pp. 230–232, January 1992.

Although a number of techniques have been developed to compensate for the above-noted corruption, e.g., as described in M. Rupp and R. Frenzel, "The behavior of LMS and NLMS algorithms with delayed coefficient update in the presence of spherically invariant processes," IEEE Trans. on Signal Processing, Vol. SP-42, No. 3, pp. 668–672, March 1994; and E. Bjarnason, "Noise cancellation using a modified form of the filtered-XLMS algorithm," Proc. Eusipco Signal Processing V, Brüssel, pp. 1053–1056, 1992, such techniques often require even more multiplications. Straightforward realizations of delayed-update LMS with compensation are described in T. Kimijima, K. Nishikawa and H. Kiya, "A pipelined architecture for DLMS algorithm considering both hardware complexity and output latency," Proc. Eusipco, Patras, Greece, pp. 503–506, September 1998.

As is apparent from the above, a need exists for improved channel estimation, channel equalization and other signal processing techniques, which can eliminate or substantially reduce the required number of multiplications, without significantly altering training behavior, numerical precision or other desirable attributes of the corresponding algorithms.

SUMMARY OF THE INVENTION

The present invention provides efficient computational techniques suitable for use in channel estimation, channel equalization and other signal processing operations. In accordance with the invention, signal processing operations are performed in a digital communication system receiver on a sequence of received symbols, each representing a number of information bits. The symbols correspond to points in a given modulation constellation generated by applying a predetermined rotation, e.g., a 45° rotation, to an otherwise conventional modulation constellation, e.g., a QPSK constellation, a 16-QAM constellation, a 64-QAM constellation, a 256-QAM constellation, a 1024-QAM constellation, etc. The use of the rotated constellation allows certain signal processing operations, such as Finite Impulse Response (FIR) filtering, Least-Mean-Squares (LMS) estimation, and Maximum-Likelihood (ML) sequence detection via the Viterbi algorithm, to be performed without the need for multipliers. By eliminating or substantially reducing the number of required multipliers, the invention significantly reduces the complexity and delay associated with the corresponding signal processing circuitry.

In an illustrative embodiment of the invention, the signal processing operation utilizes a selector to implement a complex multiplication of a channel estimate coefficient with a symbol from a given modulation constellation. The selector receives as inputs real and imaginary parts of an element of the channel estimate coefficient, and generates as outputs real and imaginary parts of a product of the element of the channel estimate coefficient and a corresponding element of a given one of the symbols, without utilizing a multiplication operation. The selector may include, e.g., first and second switches and first and second add/subtract units, the first and second switches each selecting one of the real or the imaginary part of the element of the channel estimate coefficient for application to a corresponding one of the add/subtract units, such that the add/subtract units compute elements of real and imaginary parts of an inner vector product. An FIR filter operation may be implemented using the selector by including feedback from outputs of the add/subtract units to corresponding inputs of the add/subtract units. The selectors can be arranged in multi-stage and/or hierarchical adder tree structures in order to implement the particular processing operations required in a given application.

Advantageously, the invention can not only completely eliminate multiplications in certain embodiments, but also minimizes the number of addition operations required in implementing FIR filtering and other operations prevalent in channel estimation and equalization algorithms. The invention can be embodied in channel estimation algorithms such as LMS estimation and equalization algorithms such as ML sequence detection using the Viterbi algorithm, and preserves the numerical precision of the algorithms while reducing their complexity dramatically. For example, an illustrative embodiment of the invention requires only selection operations, i.e., no adders or multipliers, to implement the multiplication of a complex-valued filter tap coefficient and a QPSK constellation point.

DETAILED DESCRIPTION OF THE INVENTION

The present invention will be described herein with reference to particular types of signal processing devices, such as FIR filters, channel estimators, channel equalizers and Viterbi decoders. It should be understood, however, that the invention is more generally applicable to other types of signal processing devices and applications.

1. Basic Rotated Constellation Approach

Figure 1A:
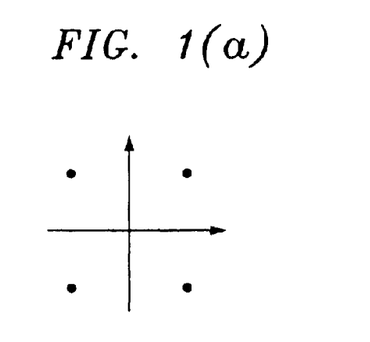
FIGS. 1(a) and 1(b) show exemplary conventional and rotated QPSK constellations, respectively.
Figure 1B:
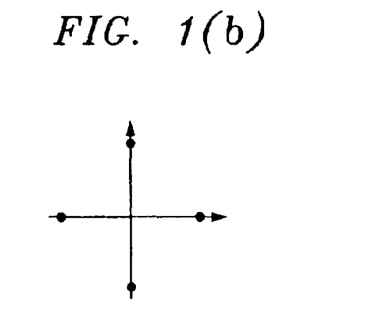

The invention will first be illustrated with an example based on QPSK modulation. Rather than using a conventional constellation, as shown in FIG. 1(a), with the constellation points, $u_i \in \{1/\sqrt{2}(\pm 1, \pm j)\}$, the invention utilizes a rotated constellation with points $u_i \in \{1, j, -1, -j\}$. The resulting rotated constellation is shown in FIG. 1(b). Rotating the constellation points in accordance with the invention does not change the behavior of the digital modulation scheme nor its transmission since any given hardware-dependent implementation as well as the transmission channel will typically add arbitrary rotations in any case. It has been noted in G. M. Durant and S. Ariyavisitakul, "Implementation of a broadband equalizer for high-speed wireless data applications," Proc. IEEE ICUPC 98, Florence, Italy, October 1998, that using $u_i \in (\pm 1 \pm j)$ rather than $u_i \in 1/\sqrt{2}(\pm 1 \pm j)$ saves complexity since multiplications can be performed as add/sub operations. However, the rotated constellation of FIG. 1(b) simplifies this operation even further. To illustrate this, consider the implementation of an inner vector product, an operation commonly used in the above-noted LMS and Viterbi algorithms. Elements of a channel estimate, e.g., are combined in a row vector $w = [w_1, w_2, \ldots, w_M]$, while transmitted modulated symbols are represented by a row vector $u = [u_1, u_2, \ldots, u_M]$. The inner vector product to compute is thus given by $$uw^T = \sum_{i=1}^{M} u_i w_i,$$

with T denoting the transpose operation. In other words, a complex multiplication is required to multiply each transmitted symbol $u_i$, where $i = 1 \ldots M$, with one of the channel estimate weights $w_i$. A complex multiplication usually requires four real multiplications and two add/subtract (add/sub) operations. That is, $u_i w_i = \text{Real}(u_i)\text{Real}(w_i) - \text{Imag}(u_i)\text{Imag}(w_i) + j\{\text{Real}(u_i)\text{Imag}(w_i) + \text{Imag}(u_i)\text{Real}(w_i)\}.$ Other realizations with three multiplications and more add/sub operations are possible:

$A = \text{Imag}(u_i) \times \{\text{Real}(w_i) + \text{Imag}(w_i)\}$ (1)

$B = \text{Real}(w_i) \times \{\text{Real}(u_i) + \text{Imag}(u_i)\}$ (2)

$C = \text{Real}(u_i) \times \{\text{Imag}(w_i) - \text{Real}(w_i)\}$ (3)

$u_i w_i = B - A + j(B + C).$ (4)

If, however, taking the structure of the rotated QPSK constellation, $u_i \in \{1, j, -1, -j\}$, into account, the multiplications completely disappear, and only the following four cases remain:

$u_i = 1: u_i w_i = \text{Real}(w_i) + j\text{Imag}(w_i)$ (5)

$u_i = j: u_i w_i = -\text{Imag}(w_i) + j\text{Real}(w_i)$ (6)

$u_i = -1: u_i w_i = -\text{Real}(w_i) - j\text{Imag}(w_i)$ (7)

$u_i = -j: u_i w_i = \text{Imag}(w_i) - j\text{Real}(w_i).$ (8)

In other words, the multiplication becomes a selection operation. As will be described in greater detail below, even the add/sub operations are not necessary.

Figure 2:
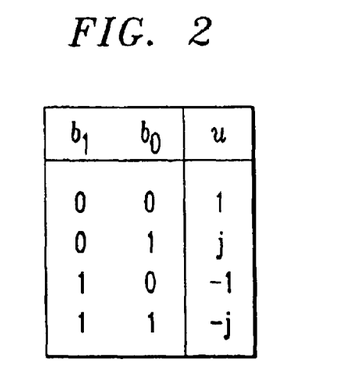
FIG. 2 is a table showing the mapping of two bits into a rotated QPSK constellation point in accordance with the invention.

FIG. 2 shows one possible mapping of pairs of bits $b_1$ and $b_0$ into the rotated QPSK constellation points $u_i \in \{1, j, -1, -j\}$ of FIG. 1(a). Arbitrary mappings, such as Gray coding, can be implemented by first applying an appropriate conversion mapping, followed by the FIG. 2 mapping.

Figure 3:
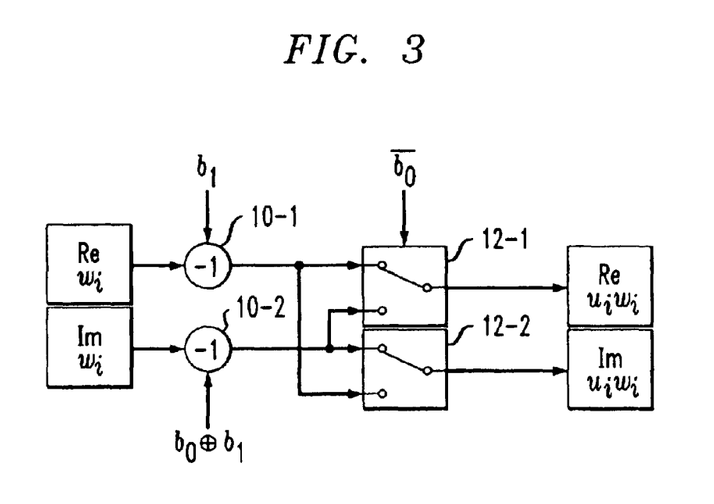
FIG. 3 shows a basic selector operation for implementing a complex multiplication of a coefficient with a symbol from a QPSK constellation, in accordance with the invention.

FIG. 3 illustrates a basic selector structure for implementing the above-noted selection operation, i.e., the selection process for a QPSK modulation that leads to a complex multiplication according to the table of FIG. 2 and Equations (5) through (8) above. The basic selector structure includes inverters 10-1 and 10-2, and switches 12-1 and 12-2, interconnected as shown. As is apparent from FIG. 3, the selection operation does not require any multiplication or addition. Instead, a two's complement logic is assumed as well as some basic logic to control the selectors based on the values of bits $b_0$ and $b_1$. In this selector structure, the inverters 10-1 and 10-2 are assumed to be active high. That is, inversion is performed if the control signal value is "1" and the input signal is passed through without inversion when the control signal value is "0." The switches 12-1 and 12-2 are assumed to be connected to the upper position when the control signal value is "1," and connected to the lower position when the control signal value is "0."

Figure 4:
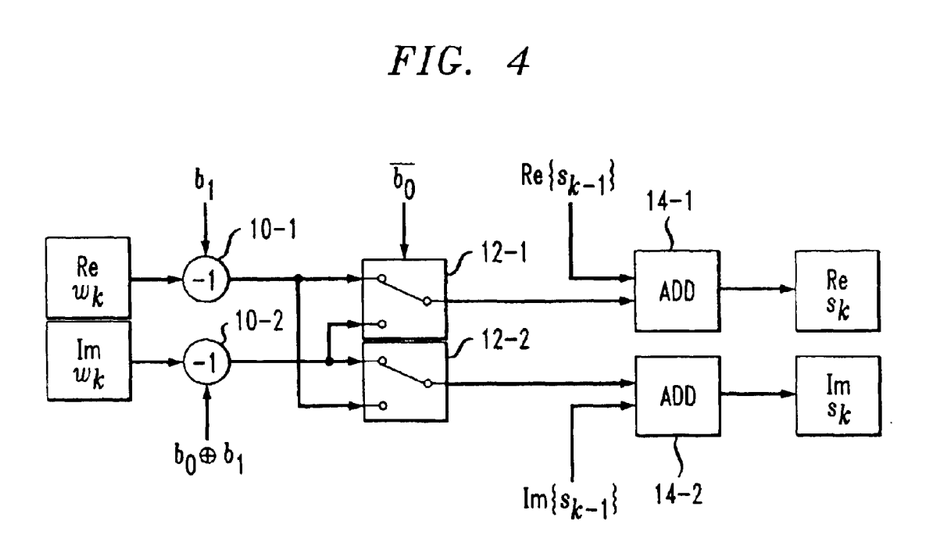
FIGS. 4 and 5 illustrate other structures for implementing filter operations in accordance with the invention, utilizing the basic selector operation of FIG. 3.
Figure 5:
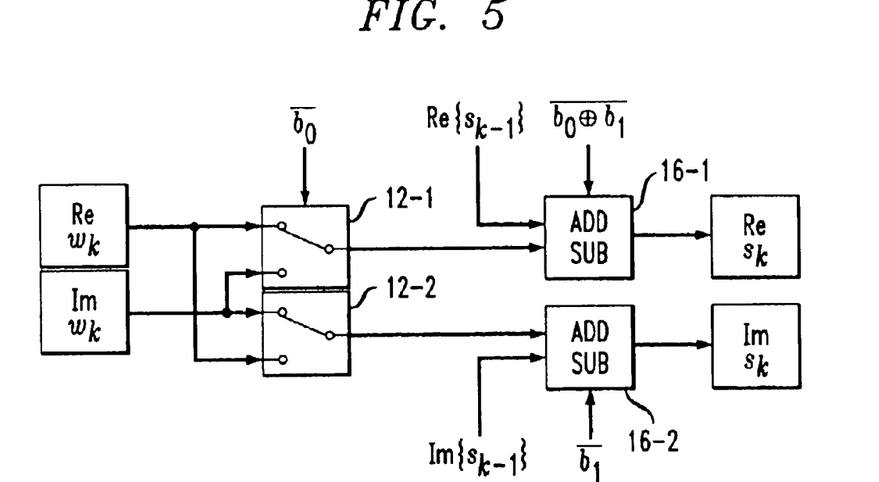

FIGS. 4 and 5 show possible hardware realizations for an operation to compute an inner vector product of length M, utilizing the basic selector of FIG. 2. In this case, addition operations cannot be completely eliminated. Assume that the partial sum is computed up to position (k−1):

$$s_{k-1} = \sum_{i=1}^{k-1} u_i w_i. \tag{9}$$

Then, the next step to compute $s_k$ is $$s_k = s_{k-1} + u_k w_k, \quad k=2 \ldots M. \tag{10}$$

The FIG. 4 implementation includes the elements of the FIG. 3 selector as well as adders 14-1 and 14-2 for adding the real and imaginary parts of $s_{k-1}$ to the real and imaginary parts, respectively, of $u_k w_k$. The FIG. 5 implementation eliminates the inverters 10-1 and 10-2 of the FIG. 3 selector by incorporating two's complement operations into add/sub units 16-1 and 16-2. Thus, apart from the switches 12-1 and 12-2 and other supporting logic, only two add/sub units are required if the sum is to be computed recursively. The add/sub units 16-1 and 16-2 are assumed to perform the addition operation when the value of their corresponding control signal is "1".

Figure 6:
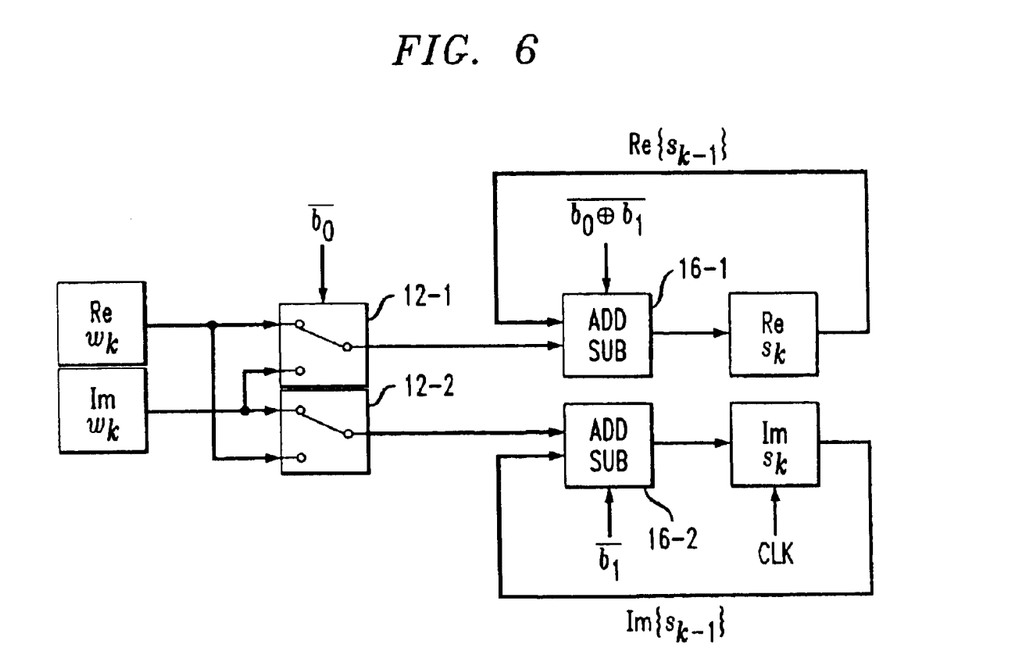
FIG. 6 shows a recursive add/sub operation for complete vector product computation in accordance with the invention.

FIG. 6 shows a fully recursive structure that can perform a complete FIR operation in accordance with Equation (9) without requiring any additional hardware. The FIG. 6 structure corresponds to the FIG. 5 structure with the addition of feedback to supply the real and imaginary parts of $s_{k-1}$ to the corresponding inputs of the add/sub units 16-1 and 16-2, respectively.

1.1 Extension to QAM Constellations

Figure 7A:
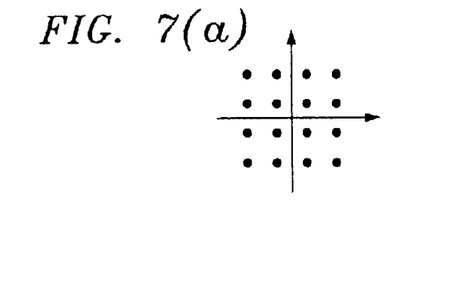
FIGS. 7(a) through 7(f) illustrate the rotation of a 16-QAM constellation, and its separation into four subsets.
Figure 7B:
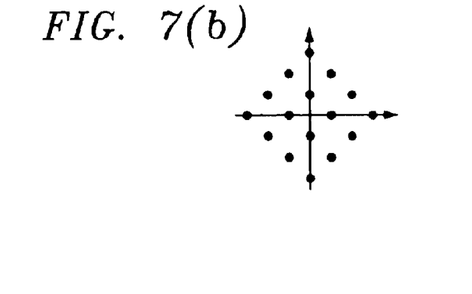
Figure 7C:
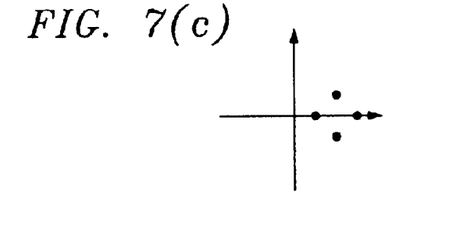
Figure 7D:
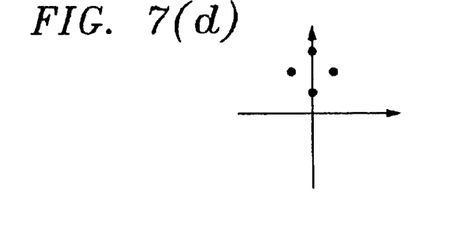
Figure 7E:
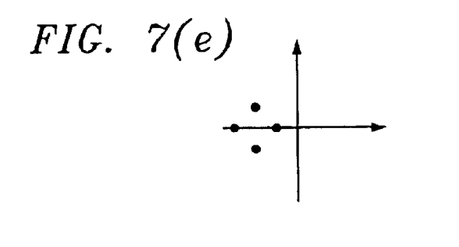
Figure 7F:
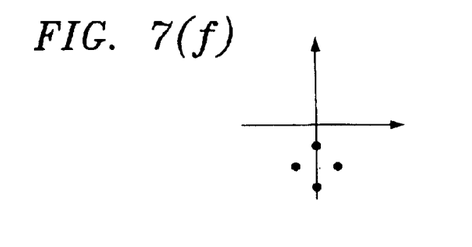

The above-described techniques can be applied to larger signal constellations, as will now be described with reference to an example based on a 16-QAM constellation. FIG. 7(a) shows the 16-QAM constellation, with a set of 16 constellation points, $u_i \in \{\pm 1 \pm j, \pm 1 \pm 3j, \pm 3 \pm j, \pm 3 \pm 3j\}$. In accordance with the invention, the FIG. 7(a) constellation is rotated by 45°, resulting in the rotated constellation as shown in FIG. 7(b). FIGS. 7(c) through 7(f) show four different subsections of the rotated constellation of FIG. 7(b).

Each subsection in this example corresponds to a translated QPSK constellation. Note also that the center point of each subsection corresponds to a point in a rotated QPSK constellation. Thus, a first step involves the selection of the center point of a subsection, which is the same as selecting a point in a rotated QPSK constellation as described previously. In a second step, the actual signal is selected. This is another selection process, similar to the previous selection. Note, however, that in the first step the value corresponding to the center point of each subsection is twice as large as the correction signal that is to be added. Thus, before the second step, a shift operation is required. In other words, in order to implement a multiplication with a symbol from a 16-QAM constellation, the corresponding channel weight is now required to be selected as described in Equations (5) through (8) above, followed by a shift operation, and finally added by another selected value, as illustrated in FIG. 8.

Figure 8:
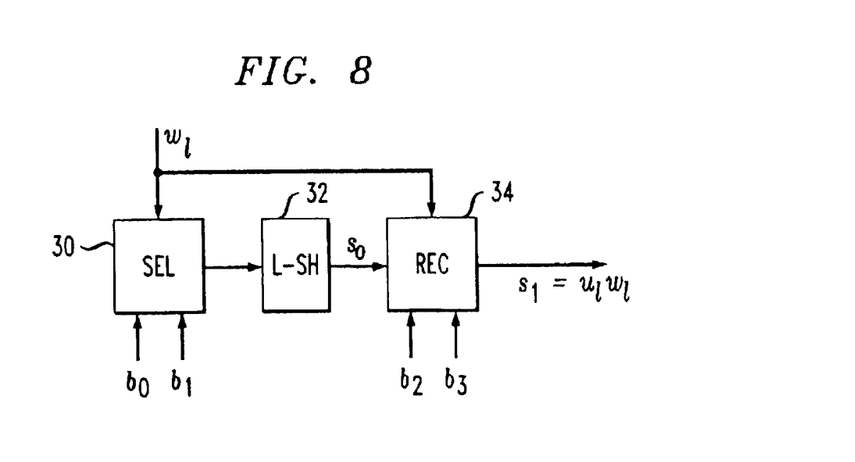
FIG. 8 shows a two-step chain for multiplication in a 16-QAM set in accordance with the invention.

The FIG. 8 structure includes a selector (SEL) 30, a left-shift (L-SH) element 32, and a recursive selector (REC) 34. The selector 30 in FIG. 8 corresponds to the selector shown in FIG. 3, and the recursive selector 34 corresponds to the recursive structure of FIG. 4 or 5. The left-shift element 30 implements the above-described left shift operation.

An example of the processing implemented by the FIG. 8 structure is as follows. Consider the constellation point (1+3j) in the conventional 16-QAM constellation, which is now mapped into (2+j) in the manner previously described. Note that the definition of one unit in actual implementation is arbitrary. In the first step, a multiply by 2 operation is performed using a selection operation implemented by selector 30, followed by a shift operation implemented by element 32. After that, the coefficient is multiplied by j, which is another selection operation. Finally, the two values obtained from the two steps are added together. This complex multiplication is implemented using two real add operations in the recursive selector 34.

Figure 9:
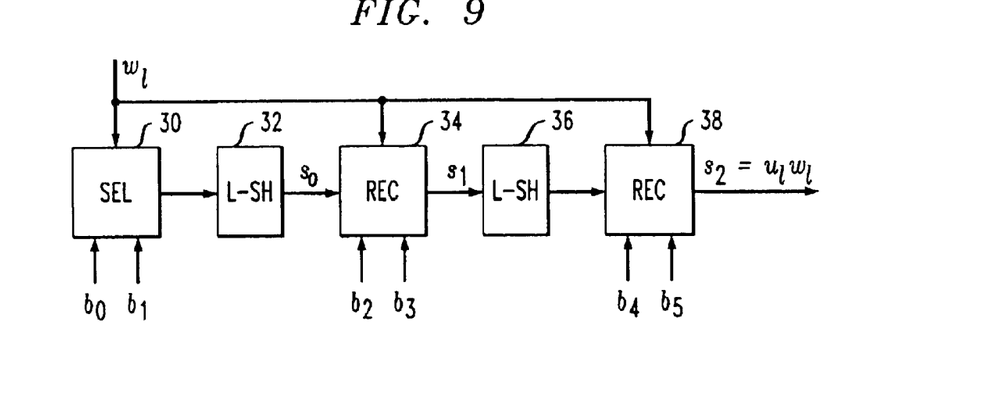
FIG. 9 shows a three-step chain for multiplication in a 64-QAM set in accordance with the invention.

FIG. 9 shows the recursive structure for multiplying with a 64-QAM constellation point. Compared to the FIG. 8 recursive structure for the 16-QAM constellation, the structure for the 64-QAM constellation requires a three stage recursion, and thus an additional left shift element 36 and recursive selector 38. The structures for larger constellations can be generated in a similar manner, as will be apparent to those skilled in the art.

1.2 Minimal Operations

The techniques of the invention as described thus far allow not only considerable reductions in computational complexity, but are also well suited for pipelined implementations. In some applications, to be described in detail below, it is of importance to compute an entire set of possible outcomes when multiplying a symbol from a limited alphabet size with a complex value $w_I$. In this case, the complexity can be reduced further since many intermediate results can be re-used.

Taking the first quadrant for the 16-QAM constellation of FIG. 7 as an example, the four possible coefficients are $$A+jB = w_R + jw_I, \tag{11}$$

$$C+jD = 3w_R + 3jw_I, \tag{12}$$

$$E+jP = 2w_R - w_I + j(2w_I + w_R), \tag{13}$$

$$G+jH = 2w_R + w_I + j(2w_I - w_R). \tag{14}$$

The operation in the first line is free, the second line costs two adds and so does the third and fourth. Since all other values can be derived from multiplying several times by j, the values are obtained by flipping the real and imaginary values and inverting them. Since only eight different values (A–H) are involved, an additional eight inverters are required. Thus, the complete cost is 6 adders and 8 inverters, or equivalently, 14 add/sub operations. Similarly, if this method is applied to a 64-QAM constellation, 36 add/sub operations plus 32 inverters are required.

2. Implementation Examples

It will now be described how the above-described techniques can be used to implement FIR filters, LMS algorithms and ML sequence detection using the Viterbi algorithm.

2.1 FIR Filter

Figure 10:
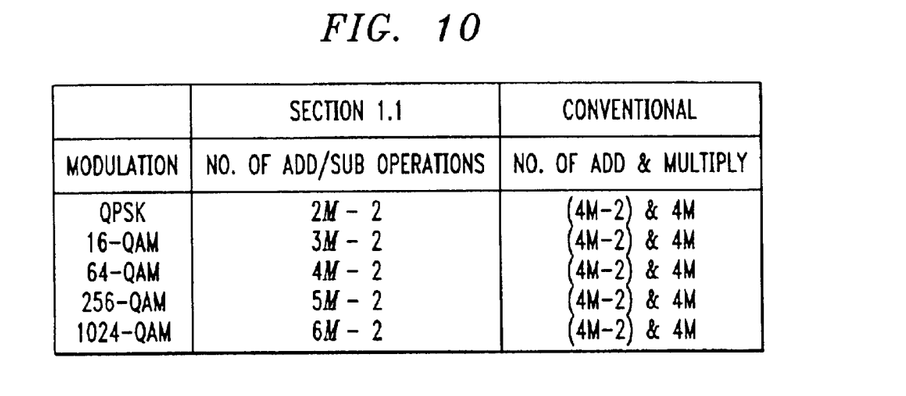
FIG. 10 is a table showing the number of add/sub operations required to implement an FIR filter with M complex-valued taps, in accordance with the invention.

FIG. 10 shows a table comparing the number of operations required in an FIR filter implemented using the techniques of Section 1.1 with that of a conventional FIR filter, for different types of modulation. A conventional FIR filter with M complex valued coefficients requires 4M real multiplications and (4M−2) real additions. The table of FIG. 10 shows the number of real add/sub operations required when applying the techniques of the invention. It can be seen from the table that, even for large constellations such as 1024-QAM, the techniques of the invention provide considerably lower complexity.

Figure 11:
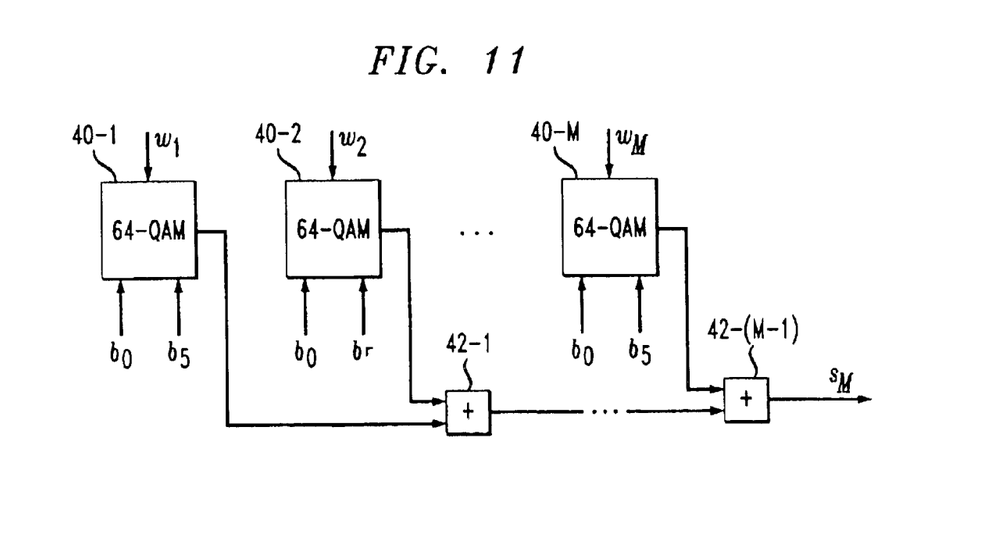
FIG. 11 shows an FIR filter chain with 64-QAM blocks for multiplication in accordance with the invention.

FIG. 11 shows a possible implementation of an FIR filter chain using a concatenation of the 64-QAM blocks of FIG. 9 for multiplication. The concatenated 64-QAM blocks are denoted 40-1, 40-2, . . . 40-M. The outputs of the blocks 40-1, 40-2, . . . 40-M are combined in corresponding adders 42-1, 42-2, . . . 42-(M−1). Another possible approach is to combine all first stages of the multiplication operations first, then the second and finally the third stages. This approach can save mantissa length and thus chip area. Typical values of M are around three to 64 while 1024-QAM or smaller constellations are typically used.

Note however that the concept of implementing FIR filters of high order generally requires a long chain of adders. Many applications can apply pipelining to this structure in order to increase throughput at the expense of increased latency and increased chip area due to additional registers. Also note that the new selector techniques of the invention generally require only a few bits of information to be stored for each symbol, e.g., two bits for QPSK, so that a pipelining implementation of the technique with its additional registers typically does not require significantly more area.

It should also be noted that some applications, such as the LMS algorithm, do not allow for latency. In this case, a hierarchical tree structure can be used to reduce the delay from (M−1) $T_a$ to $T_a \log_2 M$, where $T_a$ is the delay time of one adder. For implementing such a tree structure, the basic selector structure of FIG. 3 may be preferable, although now 2 two's complement inverters will generally be required for each coefficient, i.e., 2M such inverters altogether. These two's complement inverters require not only cell area but also introduce a carry-ripple effect similar to that of standard adders, leading to an additional delay. Structures which avoid this additional delay will now be described with reference to FIGS. 12, 13 and 14.

Figure 13:
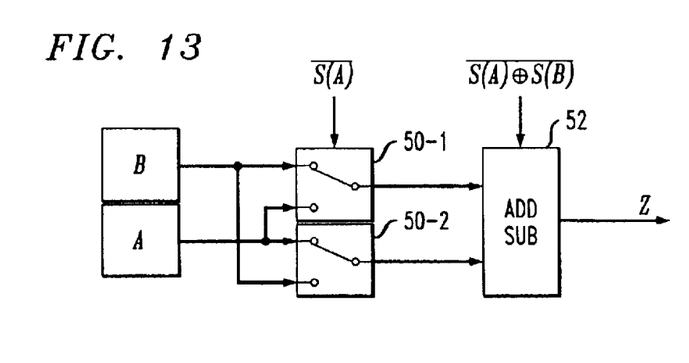
FIG. 13 illustrates a basic add/sub structure for implementing an FIR filter, in accordance with the invention.

FIG. 13 shows a basic add/sub structure for a fast FIR filter implementation suited to add or subtract two numbers A and B, i.e., to perform the operation Z=±A±B. For such an operation, either two add/sub structures or one add/sub with an additional inverter would generally be necessary. If, however, the sign signal is treated separately, just a pair of switches 50-1, 50-2 and one add/sub structure 52 is sufficient, as illustrated in FIG. 13. This results in a savings in area as well as latency. In order to realize the operation efficiently, the sign information, S(A) and S(B), for the two numbers, A and B, has to be provided. The result of the operation is a signed number Z with new sign information S(Z) and the add/sub selection:

$$S(Z)=S(A)\char`\^S(B), \qquad (15)$$

$$ADD/SUB=\overline{S(A)\oplus S(B)}. \qquad (16)$$

Figure 12:
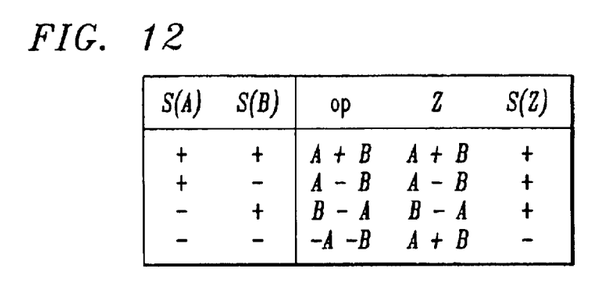
FIG. 12 is a table showing selection operations in accordance with the invention.

The "wedge" operator ^ stands for the logical and function. FIG. 12 shows a table listing the four possible operations in terms of the sign operators and the outgoing signal Z. Furthermore, a multiplexer is required to select the correct input in case of a subtraction (A−B, B−A). The number Z is passed along together with its sign S(Z) to the following adder structure. The first stage only requires an additional selector for the coefficients. For adding two numbers A and B only the first operation A+B is required.

Figure 14:
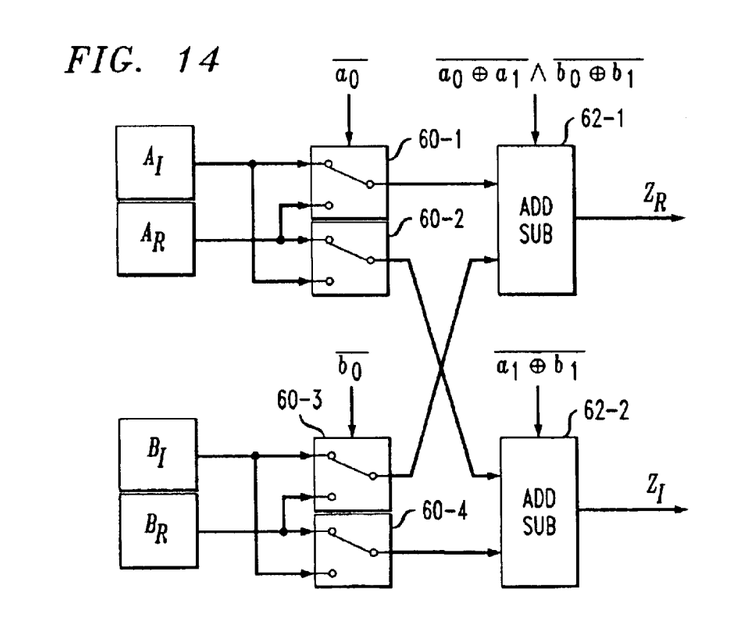
FIG. 14 illustrates a first stage of an adder tree for implementing an FIR filter, in accordance with the invention.

Treating the sign separately as described in FIGS. 12 and 13 also provides a number of additional advantages. For example, a QPSK constellation, as well as larger QAM constellations, can be implemented by assigning different values for the signs of A and B. The modulation is thus already part of the adder-tree. FIG. 14 shows a first stage of an adder tree for a fast FIR filter implementation, illustrating this feature. The first stage of the tree includes switches 60-1, 60-2, 60-3 and 60-4, and add/sub units 62-1 and 62-2, interconnected as shown.

Another advantage of treating the sign separately is that the sign information can be passed along to the next add/sub stage in the adder tree and can thus be incorporated in a subsequent add operation without the need for additional inverters. At the end of the tree structure, one inverter might be necessary to provide final correction for the sign. It will be shown in the following section that the LMS algorithm can use this sign information immediately so that even this final inverter is not required.

As described previously, the adder tree comprises add/sub structures as shown in FIG. 13, and the first stage can combine the selection of the coefficients and the add operations. This is shown in the FIG. 14 structure, which assumes that two complex coefficients $A_R+jA_I$, and $B_R+jB_I$ are QPSK modulated by the corresponding bits $\{a_0, a_1\}$ and $\{b_0, b_1\}$. The outgoing sign information of the output $Z_R+jZ_I$ is given by $$S(Z_R)=(a_0 \oplus a_1)\char`\^(b_0 \oplus b_1) \qquad (17)$$

$$S(Z_R)=a_1\char`\^b_1 \qquad (18)$$

Subsequent adder stages are constructed in a straightforward manner in accordance with Equations 15 and 16.

2.2 LMS Algorithm

The LMS algorithm is known to be of 2M complexity, and generally requires 8M real multiplications for a complex input. Its complexity is defined by two steps:

$$e(i)=d(i)-u_i w_i^T, \qquad (19)$$

the error equation with $$u_i=[u(i),u(i-1), \ldots, u(i-M+1)] \qquad (20)$$

and the coefficient update equation:

$$w_{i+1} = w_i + \mu e(i) u_i^*, \quad (21)$$

with $$w_i = [w_i(0), w_i(1), \ldots w_i(M-1)] \quad (22)$$

denoting $w_i(l)$ the tap weight at time instant i with index l ranging from 0 to M−1. If the technique as explained in the previous section is applied, the multiplications for the error e(i) computation can be substituted by select and add/sub operations. To compute the coefficient update (Equation 21), if the step-size $\mu$ is a power of two ($\mu=2^{-r}$), the multiplication $\mu e(i)$ can be replaced by a simple shift operator. The remaining multiplication with the symbols $u_i$ can also be achieved with the new technique. All that remains is to update the coefficient, which is a complex addition.

Figure 15:
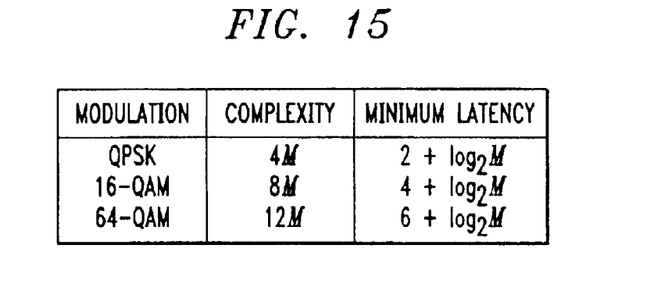
FIG. 15 is a table comparing, for different types of modulation, the number of required add/sub operations and the corresponding latency in an LMS technique in accordance with the invention.

FIG. 15 is a table showing the complexity and minimum latency of the LMS algorithm, as implemented using the techniques of the invention, for different modulation techniques. A QPSK constellation requires 2M add/sub operations to evaluate the error equation as well as updating the coefficient. For 16-QAM, the error computation requires 4M add/sub operations, the multiplication $e(i)u_i^*$ requires 2M add/sub operations, and the coefficient update requires 2M add/sub operations, i.e., 8M add/sub operations are required altogether. In summary, 4M, 8M and 12M add/sub operations are required for QPSK, 16-QAM and 64-QAM constellations, respectively. Thus when the constellation size is increased by four times, another 4M additional operations are required.

Figure 16:
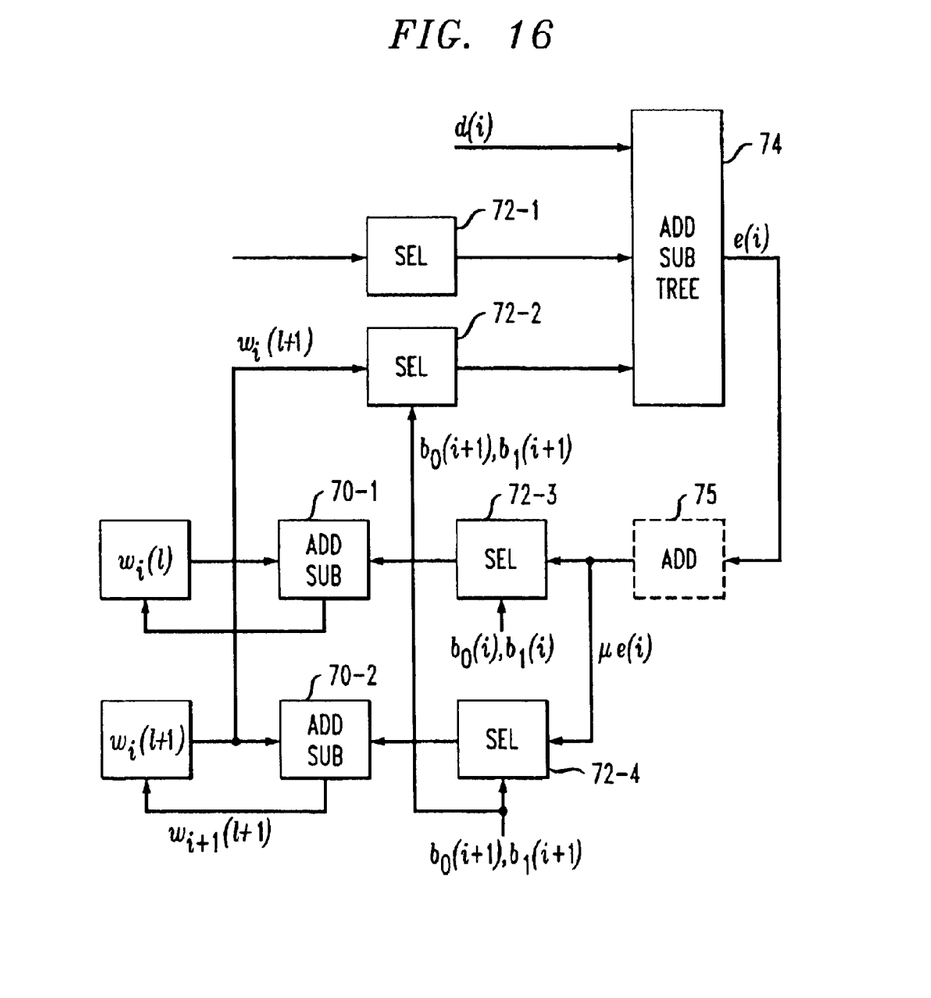
FIG. 16 illustrates an LMS update operation in accordance with the invention.

As mentioned in Section 2.1 above, faster realizations are sometimes required. For the LMS algorithm, the update cannot be performed until the error signal is available. Thus, a very rapid FIR filter chain is important. This can be implemented using the hierarchical tree structure described in Section 2.1. FIG. 16 shows an exemplary implementation of this type, comprising add/sub units 70-1 and 70-2, selectors 72-1 through 72-4, and an add/sub hierarchical tree structure 74. The computation of the error signal in this case requires an additional subtraction: $e(i)=d(i)-1_i w_i^T$. If the order of the filter is chosen to be $M=2^L-1$, d(i) can be treated as one filter tap-weight element and does not require additional delay.

As previously mentioned, depending on the sign of the last signal (in this case the error signal), a final two's complement inverter may be required. This would cost an additional delay since two's complement inverters cause carry-ripple effects. However, in the LMS algorithm, the last inverter can be incorporated into the selection process of the coefficient update, i.e., if the negative information is active, $-\mu e(i)$ is applied rather than $\mu e(i)$.

The modified selection is faster because it is realized by simple logical gates and does not require an adder structure. For QPSK, one complete update cycle requires $T_a \log_2 M$ for the FIR error part, possibly one $T_a$ for the error to multiply by the step-size $\mu$, and finally one add operation for the updates of the coefficients. Thus, the minimum update time is given by $(\log_2 M+2)T_a$. If the step-size $\mu$ is a negative power of two, the multiplication by the error is a simple scaling operation and can therefore be realized without any additional time delay. Other values of the step-size can be approximated with a sum of two such values, i.e., $\mu=2^{-l_1} \pm 2^{-l_2}$, so that one add/sub operation is sufficient for the multiplication with the error. This operation gives a wide range for possible step-size values. The possible additional operation is indicated with a dashed box 75 in FIG. 16.

As an example, assume that the LMS algorithm is applied to train a channel estimator of order M=15, and the technology used implements an add/sub operation in 1 ns and a multiplication operation in 6 ns. Thus, the whole update for a BPSK/QPSK training sequence can be performed in 6 ns with add/sub operations while it takes about 12 ns when using multipliers. The required chip area and power consumption, on the other hand, might become ten times higher to implement the multipliers. Real-time processing is thus possible for up to 1/6 ns=166 Msymbols-per-second in this case.

2.3 ML Sequence Detection

In a digital communication system that transmits information over a channel causing Inter-Symbol-Interference (ISI), the optimum detector is a maximum-likelihood symbol sequence detector (MLSD), as described in, e.g., J. G. Proakis, "Channel equalization," The Communications Handbook, CRC Press, 1997, Chapter 26; and G. D. Forney, Jr., "Maximum-likelihood sequence detection in the presence of intersymbol interference," IEEE Trans. on Information Theory, Vol. IT-18, pp. 363–378, May 1972.

An efficient algorithm for implementing a MLSD is the Viterbi algorithm, which was originally devised for decoding convolutional codes. See the above-cited J. G. Proakis reference and G. D. Forney, Jr., "The Viterbi algorithm," IEEE Proceedings, Vol. 61, pp. 268–278, March 1973. In this case, the ISI channel is modeled as a Finite-State Machine (FSM), called a trellis, with $P^{M-1}$ states. Here P is the information symbol alphabet size and M is the number of complex-valued channel FIR filter coefficients, $w_I$. In the trellis, there are P transitions diverging from each state, corresponding to the P different values of the information symbol, u(k). The values associated with the transitions between the states are $w_I u(k)$, i.e., the possible received values, given the estimated channel coefficients $w_I$.

Assuming that the received sequence is r(k), the estimated channel coefficients are $w_I$, and the input information symbols are u(k), the Viterbi algorithm finds the most-likely transmitted symbol $\vec{u}(k)$ by recursively finding the path in the trellis that is closest in Euclidean distance to the received noisy sequence r(k). That is, it implements the ML detector criterion by recursively minimizing with respect to $\vec{u}(k)$, $$\min_{u(k)} \left| r(k) - \sum_{i=1}^{M} w_i u(k-1) \right|^2 \quad (23)$$

At each recursion step, the Viterbi algorithm searches over the $P^M$ possible transitions. If the channel model coefficient changes from one recursion to the other, for every one of the M estimated channel coefficients $w_I$, P multiplications with the P symbols of the symbol alphabet are required. Thus, a total of $PM=O(PM)$ complex multiplications are required to compute the various terms initially. In order to compute the cost metrics of the $P^M$ transitions between the states in the FSM, another $(M-1) \times P^M = O(MP^M)$ complex additions are required. If this is done using a conventional method, a complex multiplication is performed with four to eight add/sub operations depending on the symbols. The value (3+7j), for example, requires one addition for the multiplication by three (3=1+2) and one subtraction for seven (7=8−1). This needs to be performed on the real as well as on the imaginary part of the coefficient, resulting in O(PM)= 4PM. Finally, the real and imaginary part needs to be added to r(k), which requires another 2 add operations. For all M coefficients and $P^M$ states, there are thus a total of $O(MP^M)=2MP^M$ add operations.

Using the techniques of the invention as described in Section 1.1 above, complexity can be reduced considerably. For QPSK, multiplication of each coefficient $w_I$ with $u(k)$ becomes a selection process, and $O(MP^M)=0$. Only the computation of the transitions remains with $O(MP^M)=2MP^M$ to compute $\tilde{r}(k)=r(k)-\Sigma_{l=1}^{M}w_l u(k-1)$ in Equation 16. For 16-QAM, the first step is a selection process, the next is two add/subs to compute each multiplication per symbol, thus $O(PM)=2PM=32M$. For 64-QAM, in each subset of four symbols 10 add/subs are required for computing the multiplication, thus $O(PM)=160M$. The application of this technique has the additional advantage that it can readily be pipelined without adding too much chip area for the additional registers.

At the expense of increasing pipelining complexity, the minimal operations described in Section 1.2 can reduce the computation complexity even further. For example, for 16-QAM modulation, $O(PM)=14M$ and for 64-QAM, $O(PM)=68M$.

Figure 17:
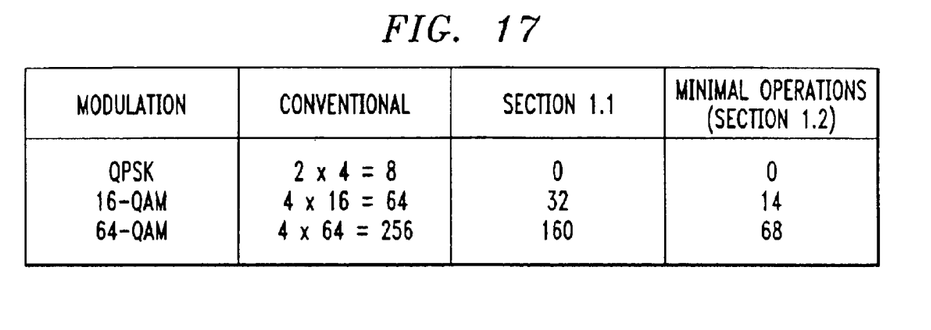
FIG. 17 is a table comparing, for different types of modulation, the number of required add/sub operations per coefficient to initialize a trellis of the Viterbi algorithm in accordance with the invention.

Initializing the trellis at the beginning of an equalization process requires computing all possible multiplications with all the elements in the symbol alphabet once. This assumes that the channel remains constant over a frame of data. If the channel is rapidly changing from symbol to symbol, this initialization has to be performed at every recursion to update the transition values of the trellis. The obtained values can be stored in a look-up table for computing the Euclidean norm in the Viterbi algorithm. FIG. 17 shows a table comparing the complexity for initialization (O(PM)) of the Section 1.1 and Section 1.2 implementations with a conventional implementation, for different types of modulation.

In order to obtain the complete complexity of the Viterbi algorithm, $O(MP^M)$ needs to be added if a full search through the trellis is applied. This part can easily exceed the initial complexity of O(PM). Reduced complexity techniques may be applied, such as reduced-state sequence estimation techniques that limit the search through the trellis, as described in, e.g., M. Eyuboglu and S. Qureshi, "Reduced-state sequence estimation for coded modulation on intersymbol interference channels," IEEE Journal on Selected Areas in Communications, Vol. 7, pp. 989–995, August 1989. In this case, the initial complexity can become very significant. Using a tree structure in accordance with the invention for implementing the add operations can further reduce the complexity as described in Section 1.1 above.

3. Receiver Examples

Figure 18:
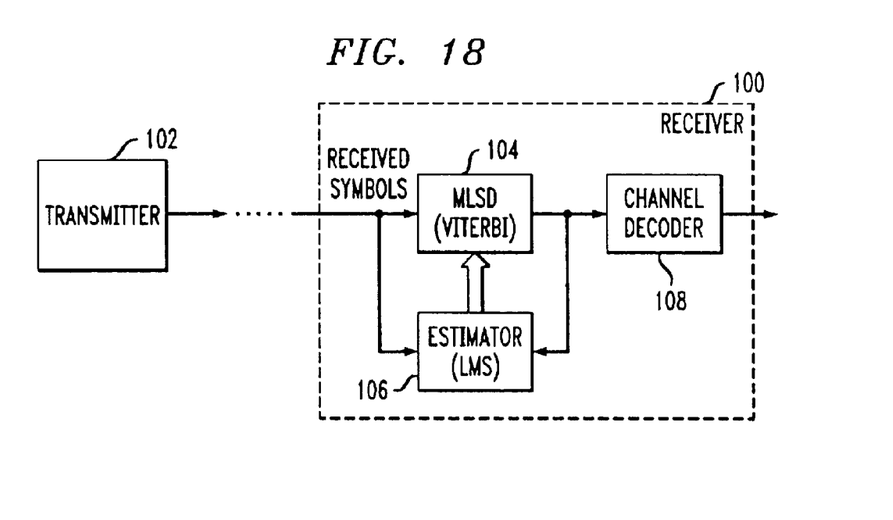
FIGS. 18 and 19 show examples of communication system receivers in which the techniques of the invention may be implemented.

FIG. 18 shows an illustrative embodiment of a receiver 100 in which the above-described signal processing operations may be implemented. The receiver 100 receives a sequence of symbols transmitted by a transmitter 102. The symbols are generated by transmitter 102 in accordance with a rotated constellation as previously described. The receiver 100 includes a ML sequence detector (MLSD) 104 which implements the Viterbi algorithm, and is connected in parallel with an LMS estimator 106. One or both of the MLSD 104 and LMS estimator 106 are implemented using the computational techniques described above. The channel estimates from the LMS estimator 106 are fed to the MLSD as shown. An optional channel decoder 108 is also included in the receiver 100.

Figure 19:
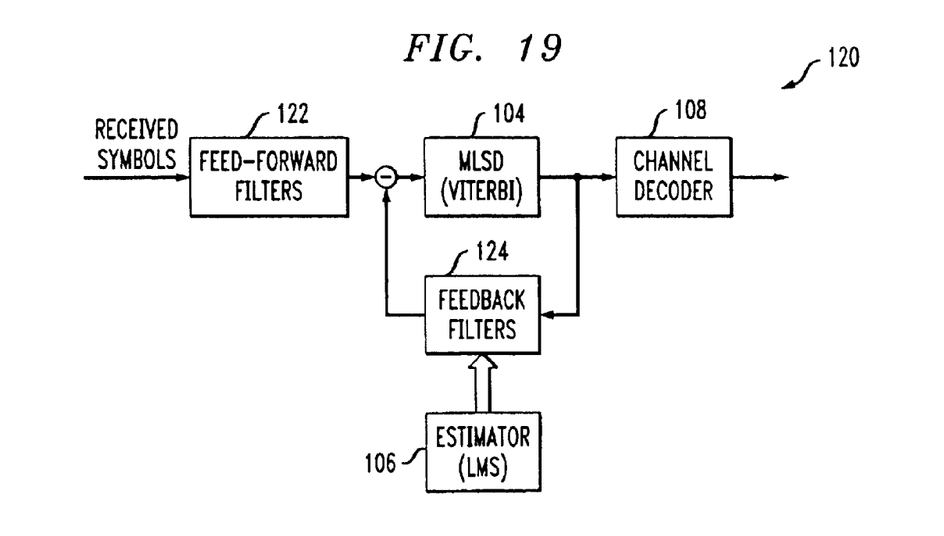

FIG. 19 shows another example receiver 120 in which the invention may be implemented. The receiver 120, which implements a decision feedback equalization (DFE) technique, and includes the MLSD 104, LMS estimator 106 and optional channel decoder 108, and also includes a set of feed-forward filters 122 and a set of feedback filters 124. The output of the LMS estimator in this case is used to determine adaptive filter taps for the set of feedback filters 124. The received symbols are processed through feed-forward filters 122, and then applied to the MLSD 104. The output of the MLSD is fedback through the feedback filters 124.

It should be noted that the arrangements of FIGS. 18 and 19 are examples only, and other embodiments may include different arrangements of elements and/or additional elements not explicitly shown.

4. Conclusion

The invention provides efficient computational methods and apparatus that allow large reductions in complexity for implementations of communication algorithms that require multiplying a coefficient with a constellation point in a PSK or QAM constellation. Chip area as well as latency can be reduced due to the substitution of multiplications by simpler functions. Note that applying this technique does not cause any approximation or reduction in precision, but simply removes area-intensive and time-intensive operations.

It should be noted that the above-described illustrative embodiments may be implemented in hardware, software or combinations of hardware and software. For example, the computational structures illustrated in FIGS. 3–6, 8, 9, 11, 13, 14 and 16 may be implemented as elements of an application-specific integrated circuit (ASIC) or other digital data processing device for use in a channel estimator, channel equalizer, demodulator, decoder or other element of a digital communication system receiver.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope of the invention as set forth in the appended claims.

What is claimed is:

1. A method of processing information in a receiver of a digital communication system, the method comprising the step of:

applying a signal processing operation to a sequence of transmitted symbols, wherein the transmitted symbols correspond to points in a first modulation constellation, the first modulation constellation corresponds to a rotated version of a second modulation constellation, and each of the transmitted symbols represents a particular number of information bits;

the signal processing operation utilizing at least one selector to compute a product of a channel estimate and a given one of the transmitted symbols;

wherein the selector receives as inputs real and imaginary parts of an element of the channel estimate, and generates as outputs real and imaginary parts of a product of the element of the channel estimate and a corresponding element of the given symbol, without requiring a multiplication operation.

2. The method of claim 1 wherein use of the first modulation constellation allows the signal processing operation to be performed without multiplication operations.

3. The method of claim 1 wherein the first modulation constellation is generated by applying a 45° rotation to the second modulation constellation.

4. The method of claim 1 wherein the second modulation constellation comprises one of a PSK constellation and a QAM constellation.

5. The method of claim 1 wherein the signal processing operation comprises at least one of a finite impulse response (FIR) filtering operation, a Least-Mean-Squares (LMS) estimation operation, and a Maximum-Likelihood (ML) sequence detection operation using a Viterbi algorithm.

6. The method of claim 1 wherein the selector comprises first and second switches and first and second add/subtract units, the first and second switches each selecting one of the real or the imaginary part of the element of the channel estimate for application to a corresponding one of the add/subtract units, such that the add/subtract units compute elements of real and imaginary parts of an inner vector product.

7. The method of claim 6 wherein an FIR filter operation is implemented using the selector by including feedback from outputs of the add/subtract units to corresponding inputs of the add/subtract units.

8. The method of claim 1 wherein the signal processing operation comprises a multi-stage multiplication operation implemented without multiplication operations, wherein each stage of the multi-stage operation corresponds to a selector, and a left shift element is arranged between an output of a given one of the stages and a corresponding input of a subsequent stage.

9. The method of claim 1 wherein the signal processing operation is implemented utilizing a multi-stage hierarchical adder tree without multiplication operations.

10. An apparatus for use in processing information in a receiver of a digital communication system, the apparatus comprising:

a signal processing circuit for processing a sequence of transmitted symbols, wherein the transmitted symbols correspond to points in a first modulation constellation, the first modulation constellation corresponds to a rotated version of a second modulation constellation, and each of the transmitted symbols represents a particular number of information bits;

wherein the signal processing circuit comprises at least one selector configured to compute a product of a channel estimate and a given one of the transmitted symbols; and wherein the selector receives as inputs real and imaginary parts of an element of the channel estimate, and generates as outputs real and imaginary parts of a product of the element of the channel estimate and a corresponding element of the given symbol, without requiring a multiplication operation.

11. The apparatus of claim 10 wherein use of the first modulation constellation allows the signal processing operation to be performed without multiplication operations.

12. The apparatus of claim 10 wherein the first modulation constellation is generated by applying a 45° rotation to the second modulation constellation.

13. The apparatus of claim 10 wherein the other modulation constellation comprises one of a PSK constellation and a QAM constellation.

14. The apparatus of claim 10 wherein the signal processing circuit comprises at least one of a finite impulse response (FIR) filter, a Least-Mean-Squares (LMS) estimator, and a Maximum-Likelihood (ML) sequence detector implemented using a Viterbi algorithm.

15. The apparatus of claim 10 wherein the selector comprises first and second switches and first and second add/subtract units, the first and second switches each selecting one of the real or the imaginary part of the element of the channel estimate for application to a corresponding one of the add/subtract units, such that the add/subtract units compute elements of real and imaginary parts of an inner vector product.

16. The apparatus of claim 15 wherein the signal processing circuit comprises an FIR filter implemented using the selector configured with feedback from outputs of the add/subtract units to corresponding inputs of the add/subtract units.

17. The apparatus of claim 10 wherein the signal processing circuit comprises a multi-stage circuit implemented without multiplication operations, wherein each stage of the multi-stage circuit corresponds to a selector, and a left shift element is arranged between an output of a given one of the stages and a corresponding input of a subsequent stage.

18. The apparatus of claim 10 wherein the signal processing circuit is implemented utilizing a multi-stage hierarchical adder tree without multiplication operations.

19. A method of processing information in a transmitter of a digital communication system, the method comprising the step of:

generating a sequence of transmitted symbols, wherein the transmitted symbols correspond to points in a first modulation constellation generated by applying a predetermined rotation to a second modulation constellation, and each of the transmitted symbols represents a particular number of information bits;

the transmitted symbols being configured such that a signal processing operation applied in a corresponding receiver of the system is implementable utilizing at least one selector configured to compute a product of a channel estimate and a given one of the transmitted symbols;

wherein the selector receives as inputs real and imaginary parts of an element of the channel estimate, and generates as outputs real and imaginary parts of a product of the element of the channel estimate and a corresponding element of the given symbol, without requiring a multiplication operation.

* * * * *